US009326141B2

(12) United States Patent
Aksu et al.

(10) Patent No.: US 9,326,141 B2
(45) Date of Patent: Apr. 26, 2016

(54) INTERNET PROTOCOL MULTIMEDIA SUBSYSTEM (IMS) AUTHENTICATION FOR NON-IMS SUBSCRIBERS

(71) Applicants: Verizon Patent and Licensing Inc., Arlington, VA (US); Cellco Partnership, Arlington, VA (US)

(72) Inventors: Arda Aksu, Martinez, CA (US); Thomas W. Haynes, San Ramon, CA (US); Miguel A. Carames, Martinez, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 273 days.

(21) Appl. No.: 14/063,945

(22) Filed: Oct. 25, 2013

(65) Prior Publication Data

US 2015/0118995 A1 Apr. 30, 2015

(51) Int. Cl.
*H04M 1/66* (2006.01)
*H04W 12/06* (2009.01)

(52) U.S. Cl.
CPC .................................... *H04W 12/06* (2013.01)

(58) Field of Classification Search
CPC ...................................................... H04W 12/06
USPC .................. 455/411, 432.1; 340/5.8; 719/311
See application file for complete search history.

(56) References Cited

U.S. PATENT DOCUMENTS

| 8,984,615 | B2* | 3/2015 | Bhuyan | H04L 63/061 |
| | | | | 719/311 |
| 2007/0043947 | A1* | 2/2007 | Mizikovsky | H04L 63/0869 |
| | | | | 713/172 |
| 2008/0095070 | A1* | 4/2008 | Chan | H04L 63/0272 |
| | | | | 370/254 |
| 2009/0206986 | A1* | 8/2009 | Murakami | H04L 63/102 |
| | | | | 340/5.8 |
| 2011/0028126 | A1* | 2/2011 | Lim | H04L 63/0853 |
| | | | | 455/411 |

* cited by examiner

*Primary Examiner* — Charles Shedrick

(57) ABSTRACT

A call session control function ("CSCF"), of an Internet Protocol Multimedia Subsystem ("IMS") core network, may receive a set of authentication credentials that do not include IMS authentication credentials; and may use the set of authentication credentials, which do not include IMS authentication credentials, to authenticate a user device for the IMS core network.

20 Claims, 8 Drawing Sheets

INTERNET PROTOCOL MULTIMEDIA SUBSYSTEM (IMS) AUTHENTICATION FOR NON-IMS SUBSCRIBERS

BACKGROUND

Computer systems provide techniques for users to communicate with each other. One example system may make use of an Internet Protocol ("IP") Multimedia Subsystem ("IMS") core network (e.g., as standardized by the Third Generation Partnership Project ("3GPP")), which may facilitate the use of IP protocols for communications, such as telephony, e-mail, voice over IP ("VoIP"), instant messaging, video messaging, and/or other services.

A service provider, such as a cellular telecommunications service provider, may provide an IMS core network, which may provide services to user devices that operate on a cellular network provided by the service provider. Other service providers may not provide an IMS core network, and user devices associated with these other service providers may lack IMS authentication functionality. Thus, when these user devices attach to networks that have IMS functionality (e.g., when roaming), these user devices may not be able to utilize IMS features.

DETAILED DESCRIPTION OF PREFERRED EMBODIMENTS

The following detailed description refers to the accompanying drawings. The same reference numbers in different drawings may identify the same or similar elements.

Some wireless networks, such as cellular telecommunications networks, may include an IMS core network, which may provide services, such as voice and/or video call services, chat services, address book services, and/or other services. Other wireless networks may not include an IMS core network. Wireless networks, which include an IMS core network, may be referred to herein as "IMS-enabled wireless networks," and wireless networks, which do not include an IMS core network, may be referred to herein as "non-IMS wireless networks."

A wireless network provider may have a roaming agreement with another wireless network provider, whereby user devices (e.g., mobile telephones) associated with the wireless network provider may attach to a wireless network associated with the other wireless network provider, and vice versa. In some scenarios, a service provider of an IMS-enabled wireless network may have a roaming agreement with a service provider of a non-IMS wireless network. Because the non-IMS wireless network does not include an IMS core network, user devices associated with the non-IMS wireless network may not include the functionality to perform an authentication procedure with the IMS core network of the IMS-enabled wireless network. Thus, when attached to the IMS-enabled wireless network (e.g., when "roaming"), user devices of the non-IMS wireless network may be unable to utilize services provided by the IMS core network.

Figure 1A:
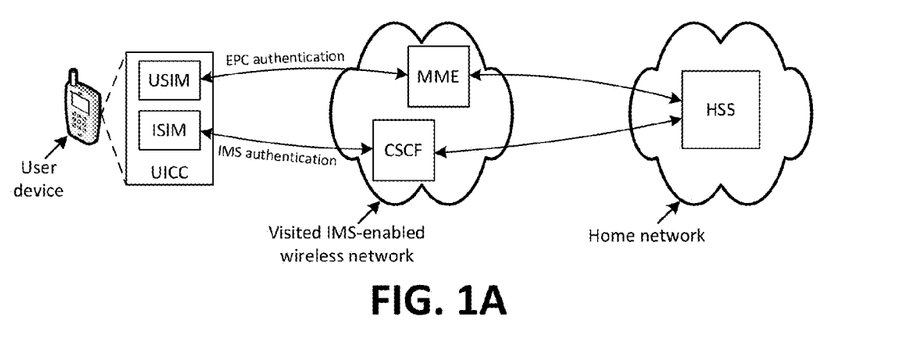
FIG. 1A illustrates an example of a traditional IMS authentication technique for a roaming user device, using an IMS Services Identity Module ("ISIM")

FIG. 1A illustrates an example of an authentication technique for a roaming user device attempting to attach to an IMS-enabled wireless network (shown in the figure as "visited IMS-enabled wireless network"). The user device shown in FIG. 1A may, in some instances, be associated with a home wireless network that is also an IMS-enabled wireless network. As shown, the user device may include a universal integrated circuit card ("UICC," sometimes informally referred to as a "SIM card"), which may include components used to perform authentication with various networks. For example, as shown, the UICC may include a USIM and an ISIM. The USIM may be used to perform authentication with an Evolved Packet Core ("EPC") portion of a wireless network ("EPC authentication"), while the ISIM may be used to perform authentication with an IMS portion of a wireless network ("IMS authentication").

Performing EPC authentication may generally allow the user device to send and receive data via a wireless network, while performing IMS authentication may specifically allow the user device to utilize IMS services associated with a wireless network. In some implementations, the authentication techniques shown in FIGS. 1A, 1B, and 2 may be two-way authentication techniques, in which a network authenticates the user device, and the user device authenticates the network.

For instance, as shown, a mobility management entity ("MME") of the visited network may perform EPC authentication in conjunction with the USIM portion of the UICC, while a call session control function ("CSCF") of the visited network may perform IMS authentication in conjunction with the ISIM portion of the UICC. As also shown in FIG. 1A, the MME and the CSCF may communicate with a home subscriber server ("HSS") of the home network of the user device, in order to facilitate the EPC authentication and the IMS authentication.

Figure 1B:
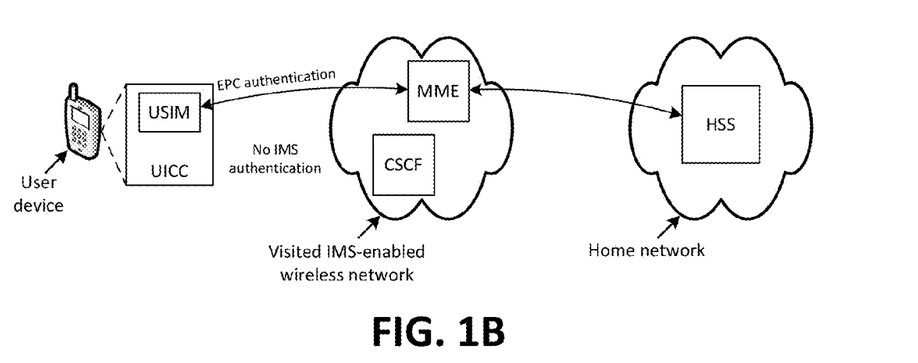
FIG. 1B illustrates an example of a situation in which IMS authentication may be unable to be performed for a roaming user device that does not include an ISIM.

FIG. 1B illustrates an example of a situation in which IMS authentication may be unable to be performed for a roaming user device that does not include an ISIM. For instance, the user device may be associated with a home network that does not include an IMS core network. Thus, a UICC associated with the user device may include a USIM, but not an ISIM. Since the CSCF may ordinarily perform authentication in conjunction with an ISIM, and since the user device does not include an ISIM, IMS authentication for the user device may be unable to be performed.

Figure 2:
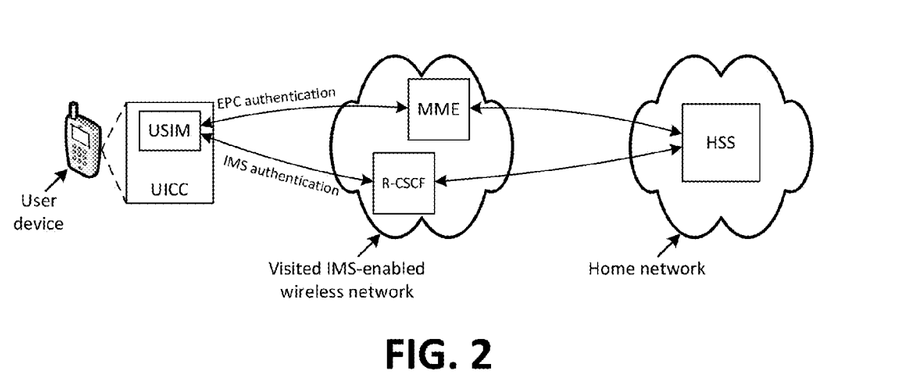
FIG. 2 illustrates an example overview of one or more implementations, in which IMS authentication may be performed for a roaming user device without using an ISIM (e.g., by using a Universal Subscriber Identity Module ("ISIM"))

FIG. 2 illustrates an example overview of one or more implementations, in which IMS authentication may be performed for a roaming user device without using an ISIM (e.g., by using a USIM). As shown, a roaming user device may attempt to attach to a visited IMS-enabled wireless network. In accordance with some implementations, the visited network may include a roaming CSCF ("R-CSCF"), which may be used to perform IMS authentication with visiting user devices that do not include an ISIM. The R-CSCF may be configured to perform IMS authentication, for the user device, in conjunction with a USIM associated with the user device (in contrast with systems in which a CSCF communicates with an ISIM to authenticate a user device).

For instance, the R-CSCF may receive a request, from the user device, to register with the IMS core network of the visited wireless network. Based on the received registration request, the R-CSCF may request, and receive, EPC authentication information for the user device from the HSS of the home network of the user device. As described herein, the R-CSCF may use the EPC authentication information to generate an EPC authentication "challenge," and send the challenge to the user device. The USIM, of the user device, may analyze the EPC authentication challenge, and may authenticate the IMS core network based on the analysis. The USIM may also generate an EPC authentication response that is based on the EPC authentication challenge, and the user device may output the EPC authentication response to the R-CSCF. The R-CSCF may analyze the EPC authentication response, and may authenticate the user device for the IMS core network based on the analysis. Once the authentication is complete, the user device may be able to send and receive data to and from the IMS core network of the visited network. Because the authentication challenge, sent by the R-CSCF, is an EPC authentication challenge in some implementations, the USIM need not be modified in order the user device to authenticate the visited IMS-enabled wireless network.

Thus, some implementations allow user devices, which do not include an ISIM (e.g., user devices that include a USIM), to perform an authentication procedure with IMS core networks. By allowing user devices, that do not have an ISIM, to receive IMS services, the functionality of such user devices may be enhanced. A service provider of the home network may be able to monetize the enhanced functionality by, for example, marketing a more versatile service, and/or by offering a subscription for IMS functionality when roaming. Additionally, a service provider of the visited network may be able to monetize the enhanced functionality by, for example, charging the roaming subscriber for usage, and/or by receiving monetary compensation from the home network in exchange for allowing user devices of the home network to use the IMS functionality of the visited network.

Figure 3:
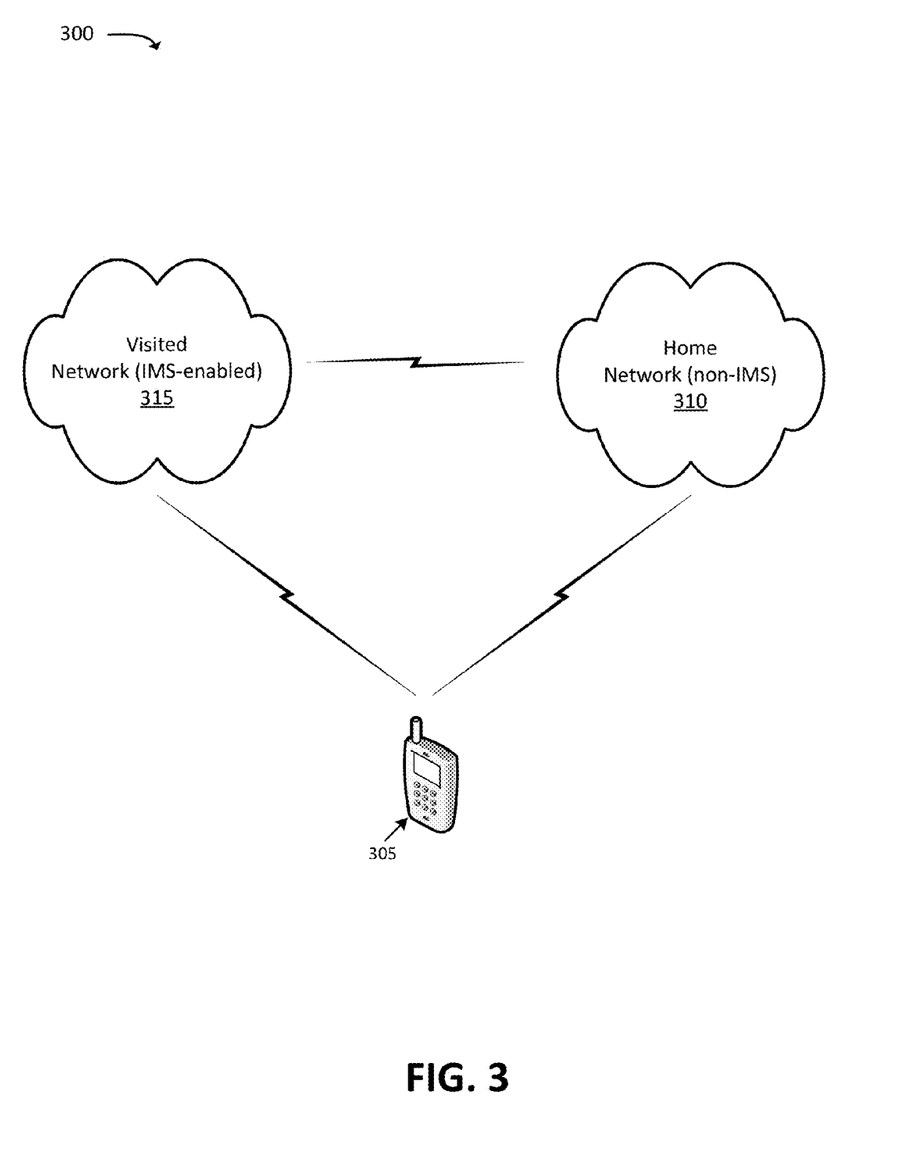
FIG. 3 illustrates an example environment in which systems and/or methods, described herein, may be implemented.

FIG. 3 illustrates an example environment 300 in which systems and/or methods, described herein, may be implemented. As shown, user device 305 may be capable of communicating with one or more wireless networks, such as home network 310 and visited network 315 (sometimes collectively referred to herein as "networks 310 and 315").

User device 305 may include a computation and communication device, such as a wireless mobile communication device that is capable of communicating with one or more networks (e.g., networks 310 and/or 315). For example, user device 305 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device.

Figure 4:
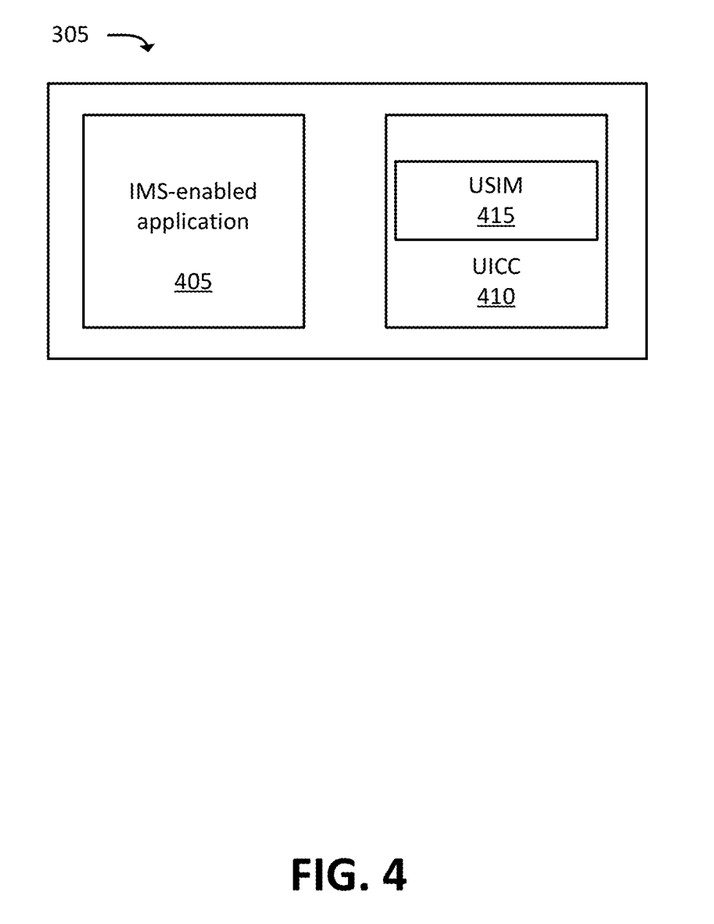
FIG. 4 illustrates example functional components of a user device, in accordance with some implementations described herein.

FIG. 4 illustrates example functional components of user device 305. As shown, user device 305 may include IMS-enabled application 405, UICC 410, and USIM 415. IMS-enabled application 405 may include hardware and/or software logic to send traffic to, and/or receive traffic from, an IMS core network. For example, IMS-enabled application 405 may be capable of utilizing services provided by an IMS core network, such as voice chat services, video chat services, instant messaging services, etc. In order to utilize the services, IMS-enabled application 405 may be capable of communicating by sending and/or receiving messages using one or more protocols that are used by an IMS network, such as Session Initiation Protocol ("SIP") messages. For instance, IMS-enabled application 405 may send an "SIP REGISTER" message to an IMS core network, in order to initiate a two-way authentication procedure with the IMS core network.

UICC 410 may include hardware and/or software logic to facilitate authentication procedures between user device 305 and one or more networks (e.g., home network 310, an EPC portion of visited network 315, an IMS portion of visited network 315, etc.). In some implementations, UICC 410 may be, may include, or may be incorporated as a portion of, a physical device (e.g., a "SIM card," or another device). In some implementations, UICC 410 may be partially or completely detachable from user device 305.

UICC 410 may, in some implementations, include USIM 415. USIM 415 may include hardware and/or software logic to facilitate authentication procedures using EPC authentication techniques. For example, as described further below, USIM 410 may receive an EPC authentication challenge and may, based on the EPC authentication challenge, authenticate a network associated with the EPC authentication challenge and/or may compute a response ("RES") to the EPC authentication challenge. For example, the authentication challenge may include a message authentication code ("MAC"), which USIM 415 may use to authenticate the network (e.g., may compare the MAC to an expected MAC ("XMAC"). Additionally, the network may compare the RES to an expected response ("XRES") in order to authenticate user device 305. In accordance with some implementations described herein, the authentication procedure performed by USIM 410 may be used by user device 305 to authenticate an IMS core network, and/or by an IMS core network to authenticate user device 305.

Returning to FIG. 3, home network 310 may be, or include, a wireless network associated with a wireless service provider that is also associated with user device 305. In accordance with some implementations herein, home network 310 may be a non-IMS wireless network (e.g., a network that does not include an IMS core network). Home network 310 may store subscriber information associated with user device 305; an owner or operator of home network 310 may configure user device 305, and/or sell user device 305 to subscribers; an owner or operator of home network 310 may bill a subscriber, associated with user device 305, for wireless services provided by home network 310; etc. Home network 310 may include Long Term Evolution ("LTE") network and/or an evolved packet core ("EPC") network that operate based on a Third Generation Partnership Project ("3GPP") wireless communication standard. The LTE network may be, or may include, a radio access network ("RAN") that includes one or more base stations, some or all of which may take the form of an eNodeB ("eNB"), via which user device 305 may communicate with the EPC network.

Visited network 315 may be, or include, an IMS-enabled wireless network (e.g., a network that includes an IMS core network). Visited network 315 may, in some implementations, also include an evolved packet system ("EPS") that includes an LTE network, an EPC network, and/or an IMS network. An owner or operator of visited network 315 may, in some implementations, have a roaming agreement with an owner or operator of home network 310, whereby user devices (such as the above-mentioned user device 305) associated with home network 310 may be authorized to attach to visited network 315. For example, as described in further detail below, visited network 315 may perform an EPC authentication technique in order to allow user device 305 to send and receive traffic via an EPC portion of visited network 315. As also described in further detail below, and in accordance with some implementations, visited network 315 may include one or more devices that perform IMS authentication to authenticate user device 305 for an IMS portion of visited network 315, without using traditional IMS authentication techniques (e.g., without communicating with an ISIM portion of user device 305).

Figure 5A:
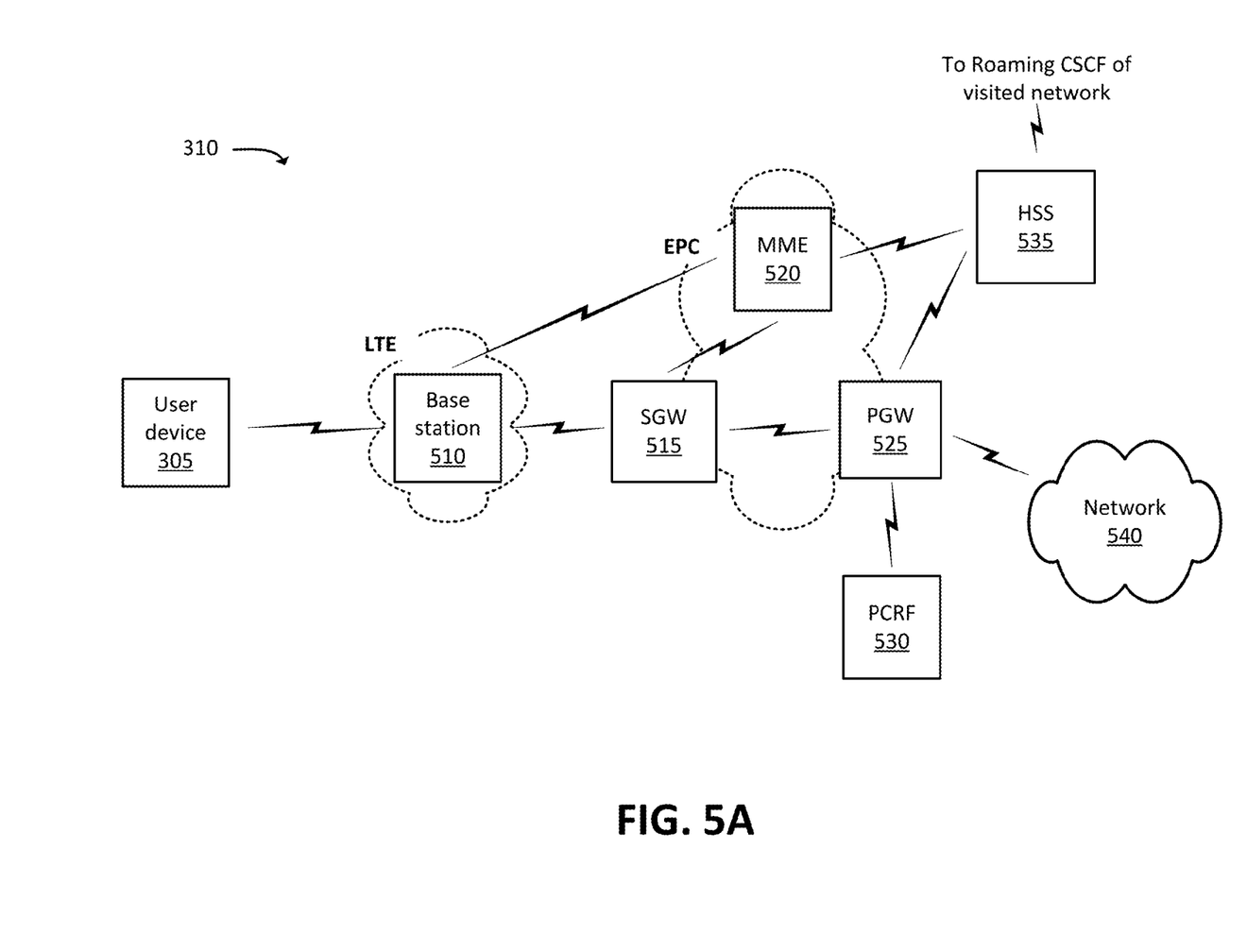
FIGS. 5A and 5B illustrate examples of networks illustrated in FIG. 3.
Figure 5B:
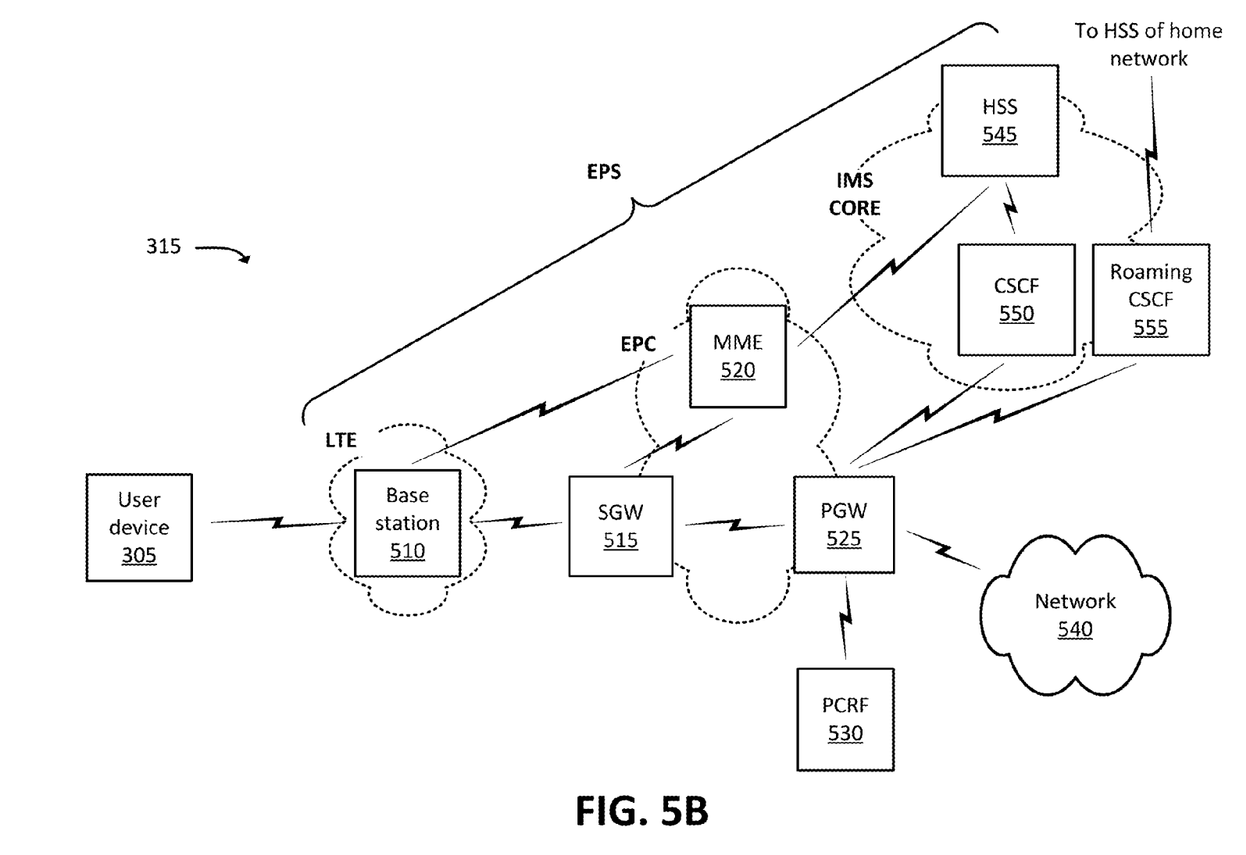

FIGS. 5A and 5B illustrate examples of networks 310 and 315, respectively, illustrated in FIG. 3. As shown in FIG. 5A, home network 310 may include base station 510, serving gateway ("SGW") 515, mobility management entity ("MME") 520, packet data network ("PDN") gateway ("PGW") 525, policy charging and rules function ("PCRF") 530, home subscriber server ("HSS") 535, and network 540.

As mentioned above, network 310 may include an EPS that includes an LTE network and/or an EPC network. The LTE network may be, or may include, a RAN that includes one or more base stations 510, some or all of which may take the form of an eNodeB ("eNB"), via which user device 305 may communicate with the EPC network. The EPC network may include one or more SGWs 515, MMEs 520, and/or PGWs 525, and may enable user device 305 to communicate with network 540 (e.g., via base station 510, SGW 515, PGW 525, and/or another device).

Base station 510 may include one or more network devices that receive, process, and/or transmit traffic, such as calls, audio, video, text, and/or other data, destined for and/or received from user device 305. In one example, base station 510 may be an eNB device and may be part of the LTE network. Base station 510 may receive traffic from and/or send traffic to network 540 via SGW 515 and PGW 525. Base station 510 may send traffic to and/or receive traffic from user device 305 via an air interface.

SGW 515 may include one or more network devices that gather, process, store, and/or provide information. For example, SGW 515 may include a gateway, a router, a modem, a switch, a firewall, a network interface card ("NIC"), a hub, a bridge, a proxy server, and/or some other type of device that processes and/or transfers traffic. SGW 515 may, for example, aggregate traffic received from one or more base stations 510 and may send the aggregated traffic to network 540 and/or the IMS core network via PGW 525. In some implementations, SGW 515 may aggregate traffic received from one or more networks (e.g., network 540), and may send the aggregated traffic to user device 305 via base station 510.

MME 520 may include one or more computation and communication devices that gather, process, search, store, and/or provide information. For example, MME 520 may perform operations to register user device 305 with the EPS, to establish bearer channels associated with a session with user device 305, to hand off user device 305 from the EPS to another network, to hand off user device 305 from the other network to the EPS, and/or to perform other operations. MME 520 may perform policing operations on traffic destined for and/or received from user device 305. MME 520 may, in some implementations, facilitate the authentication of user device 305.

For example, MME 520 may receive an EPC authentication request from user device 305, may output an EPC authentication request to HSS 535, and may receive an authorization vector from HSS 535 based on the request. The authentication vector, may include, for example, a random number ("RAND"), an authentication token ("AUTN"), an XRES, and/or other information which may be used for EPC authentication. The AUTN may include, for example, a MAC, which may be used by user device 305 to authenticate the EPC portion of home network 310. Based on the received authentication vector, MME 520 may generate an authentication challenge, which may include the RAND and the AUTN. MME 520 may send the authentication challenge to user device 305, which as described above, may compute a RES. User device 305 may output the RES and the RAND to MME 520, which may authenticate user device 305 by comparing the RES to the XRES, and by verifying that the RAND is the same RAND that was sent in the authentication challenge. As described above, the RES may be generated by USIM 415 of user device 305.

PGW 525 may include one or more network devices, or other types of computation and communication devices, that gather, process, search, store, and/or provide information in a manner described herein. For example, PGW 525 may include a gateway, a router, a modem, a switch, a firewall, a NIC, a hub, a bridge, a proxy server, an optical add-drop multiplexer ("OADM"), and/or some other type of device that processes and/or transfers traffic. PGW 525 may aggregate traffic received from one or more SGWs 525, and may send the aggregated traffic to network 540. PGW 525 may also, or alternatively, receive traffic from network 540 and/or the IMS core and may send the traffic toward user device 305 via SGW 515, and/or base station 510.

PCRF 530 may include one or more server devices, or other types of devices, that aggregate information sent to and received from the EPC network and/or other sources. PCRF 530 may receive information regarding policies and/or subscriptions from one or more sources, such as subscriber databases and/or from one or more users (such as, for example, an administrator associated with PCRF 530), and may output policy information to one or more devices that enforce the policies, such as PGW 525.

HSS 535 may include one or more server devices, or other types of devices, that gather, process, search, store, and/or provide information. For example, HSS 535 may manage, update, and/or store, in a memory associated with HSS 535, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber; and/or other information. The subscriber may be associated with, for example, user device 305.

HSS 535 may additionally, or alternatively, store information associated with authentication, authorization, and/or accounting operations associated with the subscriber and/or a communication session with user device 305. Authentication information, stored by HSS 535, may be used by MME 520 when authenticating user device 305 for the EPC portion of network 310. In some implementations, authentication information, stored by HSS 535, may additionally, or alternatively, be used by one or more devices external to network 310. For instance, as described below, an R-CSCF of visited network 315 may communicate with HSS 535 (e.g., via an interface identical or similar to an S6a interface, as described in the document, 3GPP Technical Specification ("TS") 23.401 v12.2.0, "General Packet Radio Service (GPRS) Enhancements for Evolved Universal Terrestrial Radio Access Network (E-UTRAN) Access (Release 12)"), and may use authentication information stored by HSS 535 when performing IMS authentication of user device 305. In some such implementations, HSS 535 may be configured to provide authentication information, regarding user device 305, to visited network 315 (e.g., to R-CSCF 555) based on a roaming agreement established between owners and/or operators of networks 310 and 315.

Network 540 may include one or more wired and/or wireless networks. For example, network 540 may include a wide area network ("WAN"), a metropolitan area network ("MAN"), a telephone network (e.g., the Public Switched Telephone Network ("PSTN")), an ad hoc network, an intranet, a PDN (e.g., the Internet), a fiber optic-based network, and/or a combination of these or other types of networks. In some implementations, network 540 may include a private enterprise network, and/or a private portion of a provider's back-end network.

As shown in FIG. 5B, visited network 315 may include base station 510, SGW 515, MME 520, PGW 525, PCRF 530, network 540, HSS 545, CSCF 550, and R-CSCF 555. As mentioned above, network 315 may include an EPS that includes an LTE network and/or an EPC network. The LTE network may be, or may include, a RAN that includes one or more base stations 510, some or all of which may take the form of an eNodeB ("eNB"), via which user device 305 may communicate with the EPC network. The EPC network may include one or more SGWs 515, MMEs 520, and/or PGWs 525, and may enable user device 305 to communicate with network 540, an IMS core network, and/or another network.

The IMS core network may include HSS 545, and may manage authentication, session initiation, account information, a user profile, etc., associated with user device 305. The IMS core may also include CSCF 550 and R-CSCF 555, which may perform control signaling (such as user device authentication) for the IMS core network. While shown as a single block in FIG. 5B, CSCF 550 may represent functionality associated with multiple components, such as a proxy-CSCF ("P-CSCF"), a serving-CSCF ("S-CSCF"), and/or an interrogating-CSCF ("I-CSCF"). The S-CSCF may maintain correlations between user device 305 IP addresses and SIP addresses, determine application servers to which traffic should be forwarded, provide routing services, and/or perform other functions. The I-CSCF may serve as a forwarding point for outside traffic to the IMS core network and/or to the S-CSCF, and may have a published IP address (e.g., the IP address may be registered with a Domain Name System ("DNS") server). The P-CSCF may serve as a Session Initiation Protocol ("SIP") proxy that may aid in the initial registration of user device 305 with the IMS core network.

Further, while R-CSCF 555 is shown as a single block in FIG. 5B, R-CSCF 555 may also represent functionality associated with multiple components, such as a P-CSCF, an S-CSCF, and/or an I-CSCF. In some implementations, the one or more components of R-CSCF 555 (e.g., P-CSCF, S-CSCF, and/or I-CSCF) may be separate components from the components of CSCF 550, while in some implementations, R-CSCF 555 and CSCF 550 may share one or more common components.

CSCF 550 may perform IMS authentication for user devices that include an ISIM, while R-CSCF 555 may perform IMS authentication for user devices that, for example, do not include an ISIM (e.g., user device 305). For instance, as described below, R-CSCF 555 may receive an authentication request from user device 305 (e.g., an "SIP REGISTER" message), and may obtain an EPC authentication vector from an HSS associated with home network 310 (e.g., HSS 535). R-CSCF 535 may use the EPC authentication vector, obtained from HSS 535, to authenticate user device 305 for the IMS core network. As also described below, user device 305 may use USIM 415 to provide a response to an EPC authentication challenge that R-CSCF 535 issues, and may also authenticate the IMS core network based on the received EPC authentication challenge. In this manner, user device 305 may be authenticated for use of the IMS core network without using IMS authentication credentials (e.g., as would otherwise be provided by an ISIM) for IMS authentication.

Figure 6:
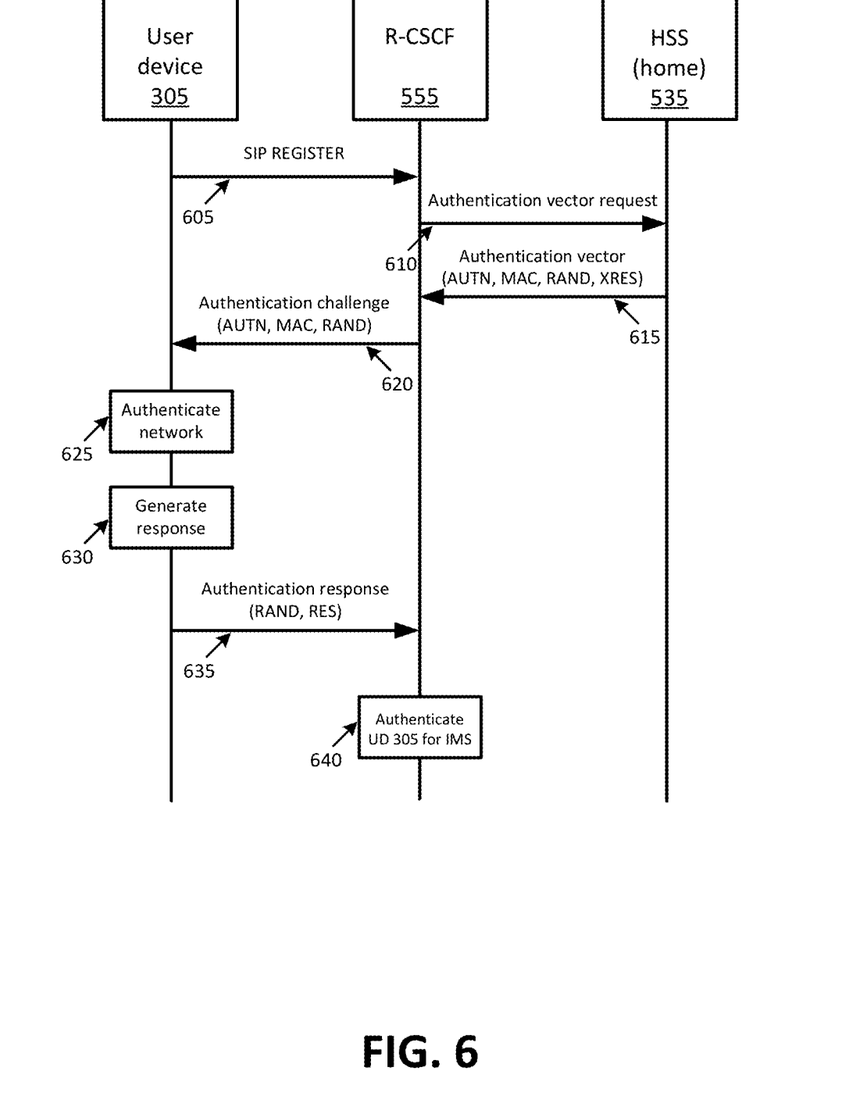
FIG. 6 illustrates an example signal flow for performing IMS authentication using non-IMS authentication credentials.

FIG. 6 illustrates an example signal flow for performing IMS authentication for a user device, without using IMS authentication credentials. In some implementations, the signaling shown in FIG. 6 may be performed after an EPC authentication procedure has taken place between user device 305 and visited network 315. For instance, user device 305 may have issued an authentication request to MME 520, received an EPC authentication challenge from MME 520, authenticated the EPC portion of visited network 310 based on the EPC authentication challenge, generated a response to the EPC authentication challenge, and sent the response to MME 520. Further, MME 520 may have authenticated user device 305, for the EPC portion of visited network 310, based on the response. In some implementations, user device 305 may receive an address (e.g., an IP address) of R-CSCF 555 during, or pursuant to, the EPC authentication procedure.

As shown in FIG. 6, user device 305 may output (at 605) a request for IMS authentication, such as an SIP REGISTER request. For example, as described above, IMS-enabled application 405 may output the SIP REGISTER request. IMS-enabled application 405 may output the request based on, for instance, receiving an indication that user device has attached to an IMS-enabled wireless network. IMS-enabled application 405 may, for example, be integrated with a protocol stack of user device 305, such that IMS-enabled application 405 is aware of the networks (or the types of networks) to which user device 305 is attached. In some implementations, IMS-enabled application 405 may otherwise receive an indication that user device 305 has attached to an IMS-enabled wireless network from some other source.

In some implementations, the SIP REGISTER request may include (e.g., in a "From:" header field of the SIP REGISTER request) identifying information of user device 305, such as an International Mobile Subscriber Identity ("IMSI") and/or other identifying information. R-CSCF 555 may receive the SIP REGISTER request, and may perform HSS discovery to identify a home HSS associated with user device 305. For instance, R-CSCF 555 may use a portion of the IMSI (e.g., the first five or six digits) to identify that user device 305 is associated with home network 310 (e.g., may identify a "realm" associated with user device 305). Based on identifying that user device 305 is associated with home network 310, R-CSCF 555 may utilize Diameter Routing in order to be able to send messages to an HSS of home network 310 (e.g., HSS 535).

R-CSCF 610 may output (at 610) an vector authentication request to HSS 535. The authentication vector request may include information identifying user device 305 (e.g., a portion of the IMSI, the entire IMSI, and/or a value that is derived based on the IMSI). HSS 535 may, in some implementations, verify that user device 305 is associated with home network 310, and may generate an authentication vector. As mentioned above, the authentication vector may include an AUTN (which may include a MAC), a RAND, an XRES, and/or other information (e.g., a cipher key, an integrity key, etc.).

R-CSCF 555 may generate an authentication challenge based on the received authentication vector. The authentication challenge may include the AUTN, MAC, and the RAND that was included in the authentication vector. R-CSCF 555 may also store the XRES that was included in the authentication vector. R-CSCF 555 may output (at 620) the authentication challenge to user device 305.

User device 305 may authenticate (at 625) the IMS core portion of visited network 315. For example, as described above with respect to FIG. 4, USIM 415 may compare the MAC, in the authentication challenge, to an XMAC. The XMAC may, in some implementations, be a value computed by USIM 415 based, at least in part, on the authentication challenge. A similar computation is described in the document, 3GPP TS 33.102 v11.5.1 ("3G Security; Security Architecture (Release 11)"). In this manner, USIM 415 may suitably authenticate R-CSCF 555 (and thus, the IMS portion of visited network 315) based on EPC credentials (provided by home HSS 535). Once user device 305 has authenticated (at 625) the IMS portion of visited network 315, user device 305 may "trust" traffic sent from the IMS portion of visited network 315, and applications running on user device 305 (e.g., IMS-enabled application 405) may be capable of utilizing services provided by the IMS core network.

User device 305 may further generate (at 630) a response (RES) to the authentication challenge. As described above, the RES may be computed by USIM 415, and may be based, at least in part, on the AUTN included in the authentication challenge. User device 305 may output (at 635) an authentication response to R-CSCF 555. The authentication response may include RES, the RAND (originally included in the authentication challenge), and/or other information.

R-CSCF 555 may authenticate (at 640) user device 305 based on the authentication response. For instance, R-CSCF 555 may compare the RES to the XRES (originally received in the authentication vector from HSS 535), and may verify that the RAND in the authentication response matches the RAND originally received in the authentication vector from HSS 535. In this manner, R-CSCF 555 may essentially perform authentication of user device 305 for an IMS core network, without using IMS authentication credentials (e.g., by using EPC authentication credentials).

Figure 7:
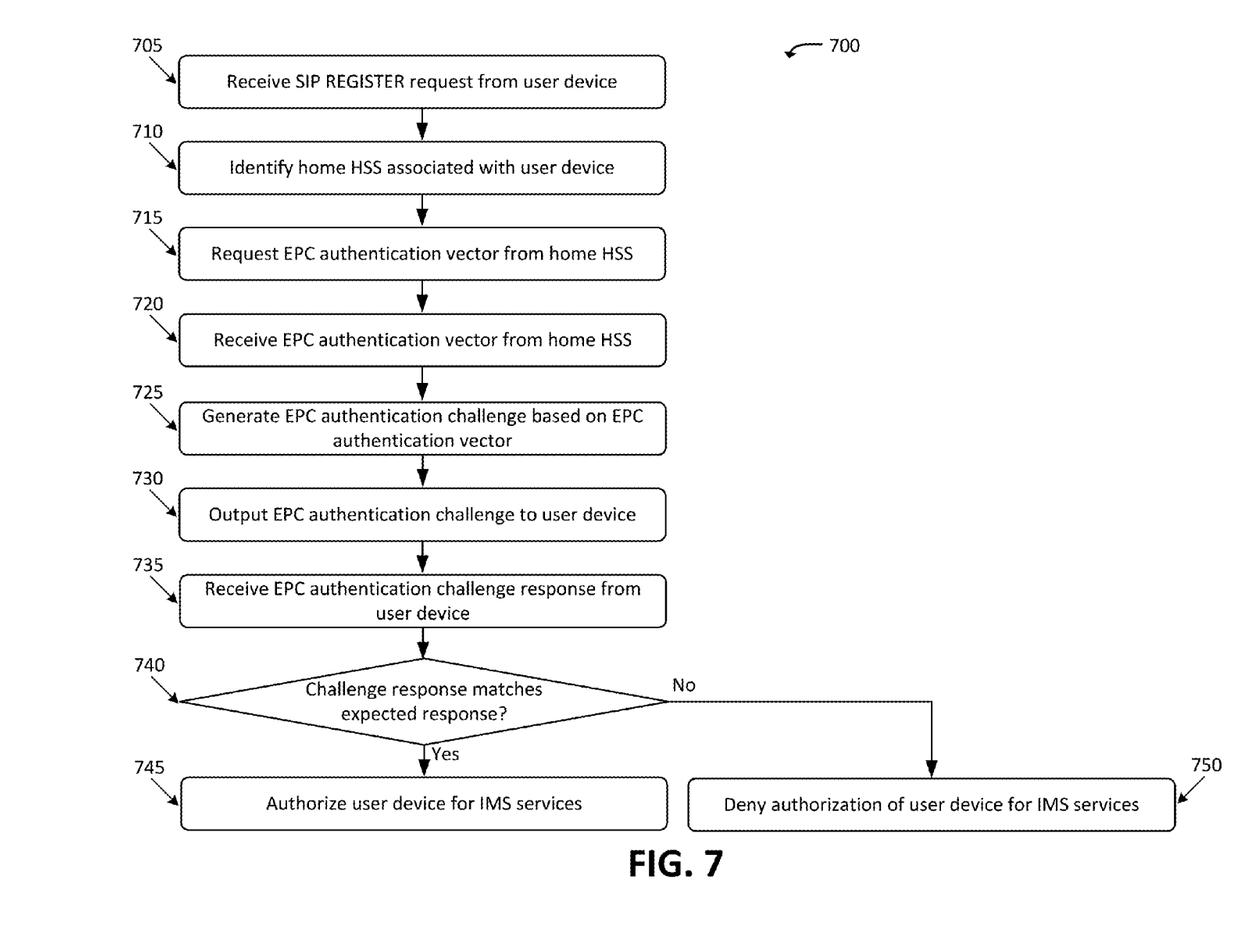
FIG. 7 is a flowchart illustrating an example process for performing IMS authentication using non-IMS authentication credentials.

FIG. 7 illustrates an example process 700 for performing IMS authentication for a user device, without using IMS authentication credentials. In some implementations, some or all of process 700 may be performed by R-CSCF 555. In other implementations, some or all of process 700 may be performed by one or more other devices.

Process 700 may include receiving an SIP REGISTER request from a user device (block 705). For example, as discussed above, IMS-enabled application 405, of user device 305, may output an SIP REGISTER request to R-CSCF 555. In this example, user device 305 may be a user device of a different network (e.g., home network 310) than a network that includes R-CSCF 555 (e.g., visited network 315).

Process 700 may also include identifying a home HSS associated with the user device (block 710). For example, as discussed above, R-CSCF may use Diameter Routing in order to identify HSS 535 of home network 310.

Process 700 may further include requesting an EPC authentication vector from the home HSS (block 715), and receiving an EPC authentication vector from the home HSS (block 720). For example, as described above, the EPC authentication vector may include a RAND, an AUTN (which may include a MAC), and an XRES.

Process 700 may also include generating an EPC authentication challenge based on the authentication vector (block 725). For example, R-CSCF 555 may generate an EPC authentication challenge that includes, or is based on, the AUTN (including the MAC) and the RAND. Process 700 may further include outputting the EPC authentication challenge to the user device (block 730).

Process 700 may additionally include receiving an EPC authentication challenge response from the user device (block 735). For example, as described above, user device 305 may use the EPC authentication challenge to authenticate the IMS portion of visited network 315, and may generate a response, which includes a RES and the RAND.

Process 700 may also include determining whether the EPC authentication challenge response matches an expected response (block 740). For example, as described above, R-CSCF 555 may compare the RES to the XRES (received from HSS 535 as part of the EPC authentication vector), and may compare the RAND (received from user device 305 as part of the EPC authentication challenge response) to the RAND (received from HSS 535 as part of the EPC authentication vector).

If the EPC authentication challenge response matches the expected response (block 740—YES), then process 700 may include authorizing the user device for IMS services (block 745). For instance, if the RES and the XRES match, and the RAND (received from user device 305 as part of the EPC authentication challenge response) matches the RAND (received from HSS 535 as part of the EPC authentication vector), then R-CSCF 555 may authenticate the user device for IMS services. Based on the authentication, R-CSCF 555 may allow IMS service-related traffic to be sent to and/or received from user device 305. If, on the other hand, the EPC authentication challenge response does not match the expected response (block 740—NO), then process 700 may include denying authorization of the user device for IMS services (block 750).

Figure 8:
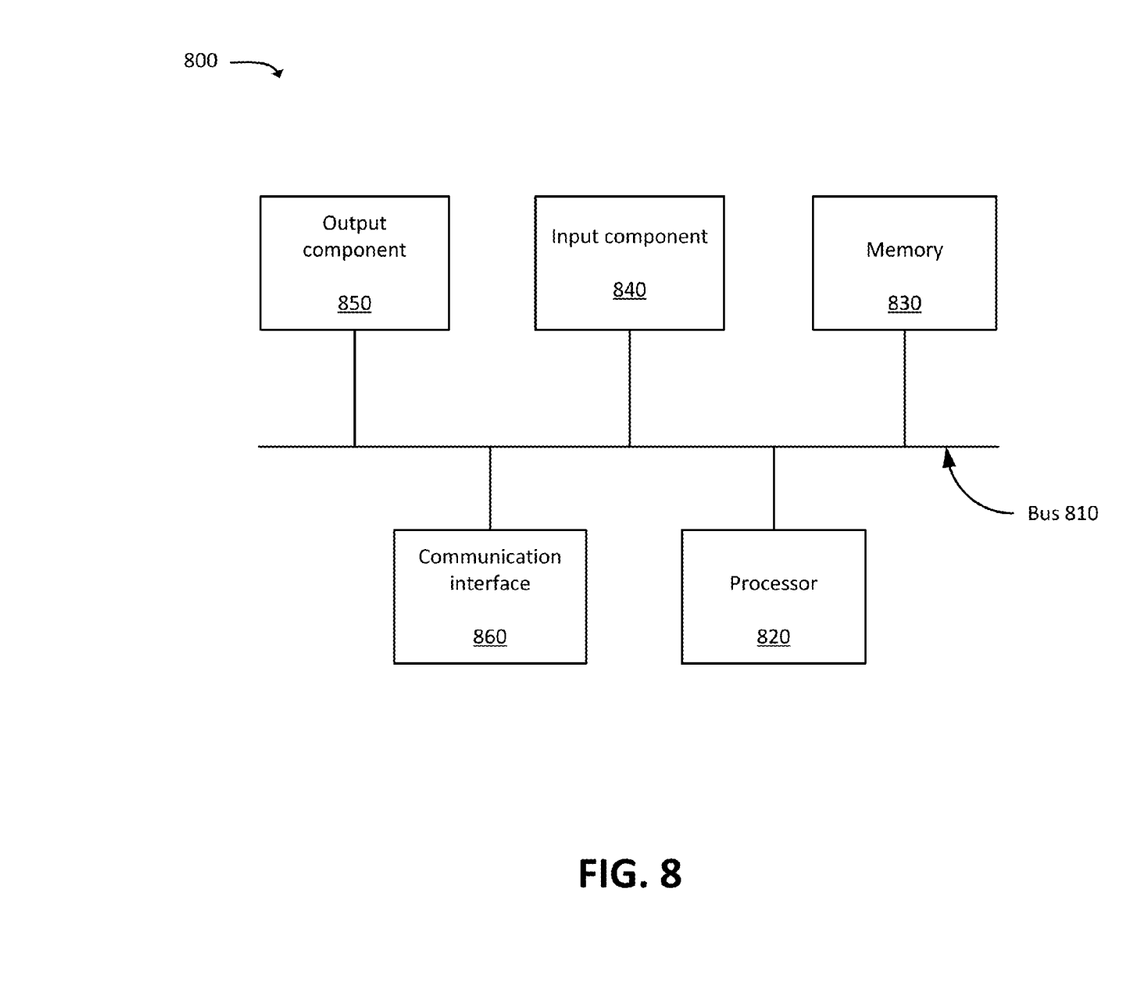
FIG. 8 illustrates example components of a device, which may be used in one or more implementations described herein.

FIG. 8 is a diagram of example components of device 800. One or more of the devices described above (e.g., with respect to FIGS. 1A, 1B, 2, 3, 4, 5A, and 5B) may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks and/or signals have been described with regard to FIGS. 6 and 7, the order of the blocks and/or signals may be modified in other implementations. Further, non-dependent blocks and/or signals may be performed in parallel. Also, additional blocks and/or signals may be present, either before, after, or in between the blocks and/or signals shown in these figures.

As another example, while the above description is described in the context of EPC authentication credentials being used for IMS authentication, in some implementations, other types of authentication credentials may be used for IMS authentication using techniques similar to those described above. Further, while the above description is described in the context of EPC authentication credentials being used for IMS authentication, in some implementations, EPC authentication credentials may be used for other types of authentication using techniques similar to those described above.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
   receiving, by a network device and from a user device, an authentication request, the user device being associated with a first network that is different from a second network associated with the network device;
   identifying, by the network device, a home subscriber server ("HSS") associated with the first network;
   requesting, by the network device, an authentication vector from the HSS;
   receiving, by the network device, the authentication vector from the HSS, wherein the authentication vector does not include authentication credentials associated with an Internet Protocol Multimedia Subsystem ("IMS");
   generating, by the network device, an authentication challenge based on the authentication vector;
   outputting, by the network device, the authentication challenge to the user device;
   receiving, by the network device and from the user device, a response to the authentication challenge,
      wherein the response from the user device includes a response computed by a Universal Subscriber Identity Module ("USIM") integrated in the user device; and
   authenticating, by the network device and based on the response, the user device for an IMS core network associated with the second network.

2. The method of claim 1, wherein the first network does not include an IMS core network.

3. The method of claim 1, wherein the network device includes a call session control function ("CSCF") associated with the IMS core network.

4. The method of claim 1, wherein the response from the user device does not include a response computed by an IMS Services Identity Module ("ISIM").

5. The method of claim 1, further comprising:
   allowing traffic, associated with IMS services, to be forwarded to the user device, the allowing being based on authenticating the user device for the IMS core network.

6. The method of claim 1, further comprising:
   identifying, based on the authentication request, a device identifier associated with the user device;
   wherein identifying the HSS includes using the device identifier.

7. The method of claim 1, wherein the user device does not include an IMS Services Identity Module ("ISIM").

8. The method of claim 1, wherein the authentication request comprises a Session Initiation Protocol ("SIP") REGISTER request.

9. A network device, comprising:
   a memory device configured to store a set of processor-executable instructions; and
   a processor configured to execute the stored processor-executable instructions, wherein executing the stored processor-executable instructions causes the processor to:

identify, based on receiving an authentication request from a user device, a home subscriber server ("HSS") associated with a first network that is associated with the user device, the first network being different from a second network associated with the network device;

request an authentication vector from the HSS;

receive the authentication vector from the HSS, wherein the authentication vector does not include authentication credentials associated with an Internet Protocol Multimedia Subsystem ("IMS"), wherein the authentication vector includes a message authentication code ("MAC");

output an authentication challenge, that is based on the authentication vector, to the user device, the authentication challenge including the MAC;

receive, from the user device, a response to the authentication challenge, the user device authenticating the network device based on comparing the MAC to an expected MAC ("XMAC"), the user device outputting the response based on authenticating the network device; and authenticate, based on the response, the user device for an IMS core network associated with the second network.

10. The network device of claim 9, wherein the first network does not include an IMS core network.

11. The network device of claim 9, wherein the network device includes a call session control function ("CSCF") associated with the IMS core network.

12. The network device of claim 9, wherein the response from the user device includes a response computed by a Universal Subscriber Identity Module ("USIM") associated with the user device,
wherein the comparing of the MAC to the XMAC is performed by the USIM in order to authenticate the network device.

13. The network device of claim 9, wherein the response from the user device does not include a response computed by an IMS Services Identity Module ("ISM").

14. The network device of claim 9, wherein executing the processor-executable instructions further causes the processor to:
allow traffic, associated with IMS services, to be forwarded to the user device, the allowing being based on authenticating the user device for the IMS core network.

15. The network device of claim 9, wherein executing the processor-executable instructions further causes the processor to:
identify, based on the authentication request, a device identifier associated with the user device;
wherein identifying the HSS includes using the device identifier.

16. The network device of claim 9, wherein the user device does not include an IMS Services Identity Module ("ISIM").

17. The network device of claim 9, wherein the authentication request comprises a Session Initiation Protocol ("SIP") REGISTER request.

18. A method, comprising:
receiving, by a call session control function ("CSCF") of an Internet Protocol Multimedia Subsystem ("IMS") core network, a set of authentication credentials that do not include IMS authentication credentials; and
using, by the CSCF, the set of authentication credentials to authenticate a user device for the IMS core network, the using including:
providing, to the user device, a challenge that is based on the EPC credentials,
wherein the user device authenticates the CSCF based on information included in the challenge, and outputs a response to the challenge based on authenticating the CSCF;
receiving, from the user device, the response to the challenge; and
authenticating the user device based on the received response to the challenge.

19. The method of claim 18, wherein the EPC credentials include a message authentication code ("MAC"), wherein the user device compares the MAC to an expected MAC ("XMAC"), wherein the user device authenticates the CSCF when the MAC matches the XMAC.

20. The method of claim 19, wherein a Universal Subscriber Identity Module ("USIM"), which is physically integrated in the user device, performs the comparison of the MAC to the XMAC.

* * * * *